UNITED STATES PATENT OFFICE.

T. C. TAYLOR, OF CAMDEN, NEW JERSEY.

IMPROVEMENT IN SOAP-MANUFACTURING PROCESSES.

Specification forming part of Letters Patent No. 11,098, dated June 13, 1854.

*To all whom it may concern:*

Be it known that I, T. CHALKLEY TAYLOR, of Camden, in the county of Camden and State of New Jersey, have invented certain new and useful Improvements in the Manufacture of Soap; and I do hereby declare the following to be a full, clear, and exact description of the method in which I accomplish the same, and also the difference between my invention and what has been heretofore done.

I am aware that potatoes and other similar bulbous or vegetable substances have been combined and used with an alkali in the manufacture of soap; but in all these cases the potatoes have either been divested of their skins, boiled, and mashed, (which latter also involves the loss of the skins, which are an active detergent,) or otherwise manufactured or prepared previous to their combination with the other ingredients.

The nature of my invention consists in using the potatoes or other vegetable substances similar in their nature in their natural state in such manner as to absorb in the alkali both the skin and the inside of the potato without any loss of material and at great saving of expense and economy of time.

To enable others skilled in the art to make and use my invention, I will proceed to describe one of the modes of reducing it to practice.

I first prepare an aqueous solution of alkali, showing from 10° to 15° on the hydrometer, (Baumé,) which may be partially warmed in any suitable vessel. I then take potatoes or other similar vegetable substances, (in the proportion of about fifty pounds of potatoes to eight gallons of the alkali,) which have been previously washed to rid them of dirt, grit, &c., and which, if too large, may be partially broken or crushed, and place them in a vessel with the alkali, when the whole is brought up to the boiling-point until the material is combined into one creamy mass. The alkali by first coming in contact with the skin of the potato in its native state absorbs or takes up the whole of it, the inner part combining with it much more readily than the outer part. When the skins have been previously heated or boiled the alkali will not combine with or absorb them, and it might be proper for me to state that I have proved practically that when the potatoes are first prepared by boiling or otherwise, the skins will not combine with the alkali, their chemical affinity having been destroyed, and they must be removed, and consequently lost, and for these reasons the skins have been in all cases heretofore known removed preparatory to their use, as they cannot be easily separated from the finished material. Boiling and mashing the potatoes preparatory to their being placed in the alkali produces the same consequent loss of the skin; but by the use of these substances in a natural or unprepared state the skin is readily taken up and absorbed with the other portions of the material, and becomes one of the ingredients in the manufactured article.

After the vegetable substances are fully combined with the alkali by boiling, the grease, resin, or such other material as is commonly used in the manufacture of soap, may be added, and the process completed in the manner well known to those accustomed to manufacture this article; or this compound of the vegetable ingredients with the alkal, may be economically and advantageously used in reducing or mixing with other soaps.

Having thus fully described my invention, I would state that I am aware that potatoes and other similar bulbous or vegetable materials, divested of their skins, boiled, and mashed, or otherwise prepared or manufactured so as to involve a loss of the skins, have been used as ingredients in the manufacture of soap. This I do not claim; but

What I do claim as new, and desire to secure by Letters Patent, is—

The process herein described of treating by alkali, in a cold or tepid state, potatoes with their skins on, in the manner and for the purpose set forth.

T. CHALKEY TAYLOR.

Witnesses:
A. B. STOUGHTON,
T. C. DONN.